United States Patent
Wills et al.

(10) Patent No.: US 10,145,547 B2
(45) Date of Patent: Dec. 4, 2018

(54) CABLE LIGHT

(71) Applicant: TTI (MACAO COMMERCIAL OFFSHORE) LIMITED, Macau (MO)

(72) Inventors: Patrick L. Wills, Easley, SC (US); Matthew T. Aaron, Greenville, SC (US); Brian Mertel, Simpsonville, SC (US); W. Steven Register, Anderson, SC (US); Ryan Altenburger, Greenville, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/643,773

(22) Filed: Jul. 7, 2017

(65) Prior Publication Data

US 2018/0010777 A1    Jan. 11, 2018

Related U.S. Application Data

(60) Provisional application No. 62/359,772, filed on Jul. 8, 2016.

(51) Int. Cl.
*F21V 23/02* (2006.01)
*F21V 23/00* (2015.01)
(Continued)

(52) U.S. Cl.
CPC .............. *F21V 23/023* (2013.01); *F21K 9/20* (2016.08); *F21K 9/278* (2016.08); *F21L 4/00* (2013.01);
(Continued)

(58) Field of Classification Search
None
See application file for complete search history.

(56) References Cited

U.S. PATENT DOCUMENTS

| 4,654,766 A | 3/1987 | Tung |
| 5,311,417 A | 3/1994 | Heh |

(Continued)

FOREIGN PATENT DOCUMENTS

| CN | 202757038 | 2/2013 |
| CN | 202769506 | 3/2013 |

(Continued)

OTHER PUBLICATIONS

Larsen Electronics,"125 Watt Temporary Construction String Light," <http://www.larsonelectronics.com/images/product/specsheet/105748.pdf> accessed Jul. 1, 2016.

(Continued)

*Primary Examiner* — Ashok Patel
(74) *Attorney, Agent, or Firm* — Michael Best & Friedrich LLP

(57) ABSTRACT

A cable light includes a battery receptacle that is electrically coupled to a first light module and a second light module. The battery receptacle includes a battery port that receives and retains a battery, such as a power tool battery pack. The first light module and the second light module each include a housing supporting a lens, a light emitter such as an LED, a reflector, and a hanger to hang the light modules on a workpiece. The first light module is electrically coupled to the battery receptacle, and the second light module is electrically coupled to the battery receptacle via a connection with the first light module. The battery receptacle communicates electrical power from the battery pack to the light modules to power the light emitters.

21 Claims, 9 Drawing Sheets

(51) Int. Cl.
*F21S 9/02* (2006.01)
*F21V 21/14* (2006.01)
*F21V 7/00* (2006.01)
*F21V 3/00* (2015.01)
*F21L 4/00* (2006.01)
*H01M 2/10* (2006.01)
*F21K 9/20* (2016.01)
*F21K 9/278* (2016.01)
*F21Y 115/00* (2016.01)
*F21Y 105/10* (2016.01)
*F21Y 103/10* (2016.01)
*F21Y 115/10* (2016.01)

(52) U.S. Cl.
CPC .............. *F21S 9/02* (2013.01); *F21V 7/0083* (2013.01); *F21V 21/14* (2013.01); *F21V 23/002* (2013.01); *H01M 2/1022* (2013.01); *F21V 3/00* (2013.01); *F21V 7/0066* (2013.01); *F21Y 2103/10* (2016.08); *F21Y 2105/10* (2016.08); *F21Y 2115/00* (2016.08); *F21Y 2115/10* (2016.08)

(56) References Cited

U.S. PATENT DOCUMENTS

| | | | |
|---|---|---|---|
| 5,558,422 | A | 9/1996 | Sanford |
| 5,957,564 | A | 9/1999 | Bruce et al. |
| 6,072,280 | A | 6/2000 | Allen |
| 6,296,364 | B1 | 10/2001 | Day et al. |
| 6,402,341 | B1 | 6/2002 | Onate |
| 6,578,981 | B2 | 6/2003 | Jackson et al. |
| 7,011,427 | B1 | 3/2006 | Baez |
| 7,021,787 | B1 | 4/2006 | Kuelbs |
| 7,178,930 | B2 | 2/2007 | Damrau |
| 7,244,045 | B2 | 7/2007 | Schrimmer et al. |
| 7,249,863 | B2 | 7/2007 | Ballarini et al. |
| 7,393,113 | B2 | 7/2008 | Damrau |
| 7,508,141 | B2 | 3/2009 | Wong |
| 7,819,545 | B2 | 10/2010 | Ponamar |
| 7,878,678 | B1 | 2/2011 | Stamatatos et al. |
| 8,388,188 | B2 | 3/2013 | Propp |
| 8,450,935 | B2 | 5/2013 | Neuman |
| 8,491,155 | B1 | 7/2013 | Cherry, II et al. |
| 8,492,990 | B2 | 7/2013 | Neuman |
| 8,579,463 | B2 | 11/2013 | Clough |
| 9,089,030 | B2 | 7/2015 | Neuman |
| 9,328,881 | B2 | 5/2016 | Hopper |
| 2004/0183480 | A1 | 9/2004 | Halter |
| 2004/0233668 | A1 | 11/2004 | Telfer et al. |
| 2005/0117339 | A1 | 6/2005 | Pan |
| 2007/0041188 | A1 | 2/2007 | Angelos et al. |
| 2007/0103897 | A1 | 5/2007 | Lu |
| 2008/0025025 | A1 | 1/2008 | Tong |
| 2008/0174995 | A1 | 7/2008 | Tong |
| 2009/0103287 | A1 | 4/2009 | Medley |
| 2009/0273928 | A1 | 11/2009 | Rizopoulos |
| 2010/0237789 | A1 | 9/2010 | Feng |
| 2010/0286910 | A1 | 11/2010 | Hudson |
| 2010/0321932 | A1 | 12/2010 | Tong |
| 2011/0085327 | A1 | 4/2011 | Chen |
| 2012/0033416 | A1 * | 2/2012 | Ballard .................. F21L 4/027 362/202 |
| 2012/0119664 | A1 | 5/2012 | Hsu |
| 2014/0043800 | A1 | 2/2014 | Weber et al. |
| 2014/0119015 | A1 | 5/2014 | Morgan |
| 2014/0233234 | A1 | 8/2014 | Bokun |
| 2014/0252958 | A1 | 9/2014 | Subotnick et al. |
| 2014/0327375 | A1 | 11/2014 | Carlin et al. |
| 2015/0003062 | A1 | 1/2015 | Allen et al. |
| 2015/0300625 | A1 | 10/2015 | Land et al. |
| 2015/0362138 | A1 | 12/2015 | Ben Aharon |
| 2015/0373449 | A1 | 12/2015 | Jackson |
| 2016/0014871 | A1 * | 1/2016 | Dobbins ............ H05B 33/0854 315/152 |
| 2016/0033096 | A1 | 2/2016 | Satyaketu |
| 2016/0037883 | A1 | 2/2016 | Keeler et al. |
| 2016/0080848 | A1 | 3/2016 | Lieblein |
| 2016/0178172 | A1 | 6/2016 | Boyink |
| 2016/0183338 | A1 | 6/2016 | Loomis et al. |

FOREIGN PATENT DOCUMENTS

| | | |
|---|---|---|
| CN | 203979980 | 12/2014 |
| DE | 20211014 | 2/2003 |
| DE | 102010039673 | 3/2013 |
| EP | 1878965 | 1/2008 |
| KR | 2004068862 | 9/2013 |
| WO | 2010034108 | 4/2010 |
| WO | 2013086680 | 6/2013 |
| WO | 2014165006 | 10/2014 |
| WO | 2014201772 | 12/2014 |

OTHER PUBLICATIONS

Lind Equipment, "Hazardous Location Lights," <http://www.lindequipment.net/xplights.htm#Stringlights> accessed Jul. 1, 2016.
Coleman, "LED String Lights," <http://www.coleman.com/led-string-lights/2000024165.html#start=1> accessed Jul. 1, 2016.
European Patent Office Search Report for Application No. 17180379.4 dated Nov. 7, 2017, 8 pages.

* cited by examiner

CABLE LIGHT

CROSS-REFERENCE TO RELATED APPLICATIONS

This application claims priority to U.S. Provisional Patent Application No. 62/359,772 filed on Jul. 8, 2016, the entire content of which is incorporated herein by reference.

BACKGROUND

Lights are often required on job sites or in other construction areas where light is generally not available. While area lights or flash lights can provide some illumination, they must be repositioned constantly to provide the necessary light in a large area.

SUMMARY OF THE INVENTION

The invention provides, in one aspect, a cable light including a battery receptacle having a housing defining a battery port configured to receive and retain a removable power tool battery pack. The cable light also includes a first light module electrically coupled to the battery receptacle. The first light module includes a housing supporting a lens and a light emitter configured to receive power from the removable power tool battery pack. The cable light further includes a second light module electrically coupled to the battery receptacle via the first light module. The second light module includes a housing supporting a lens and a light emitter configured to receive power from the removable power tool battery pack.

The invention provides, in another aspect, a lighting system includes a removable power tool battery pack including a battery cell, a battery receptacle having a housing defining a battery port that receives and retains the removable power tool battery pack, and a first light module that is electrically coupled to the battery receptacle via a first cable extending between the battery receptacle and the first light module. The first light module includes a housing supporting a reflector, a light emitter configured to receive power from the removable power tool battery pack, a hanger, and a lens. The lighting system also includes a second light module that is electrically coupled to the battery receptacle via a second cable extending between the first light module and the second light module. The second light module includes a housing supporting a reflector, a light emitter configured to receive power from the removable power tool battery pack, a hanger, and a lens.

Other aspects of the invention will become apparent by consideration of the detailed description and accompanying drawings.

BRIEF DESCRIPTION OF THE DRAWINGS

To easily identify the discussion of any particular element or act, the most significant digit or digits in a reference number refer to the figure number in which that element is first introduced.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
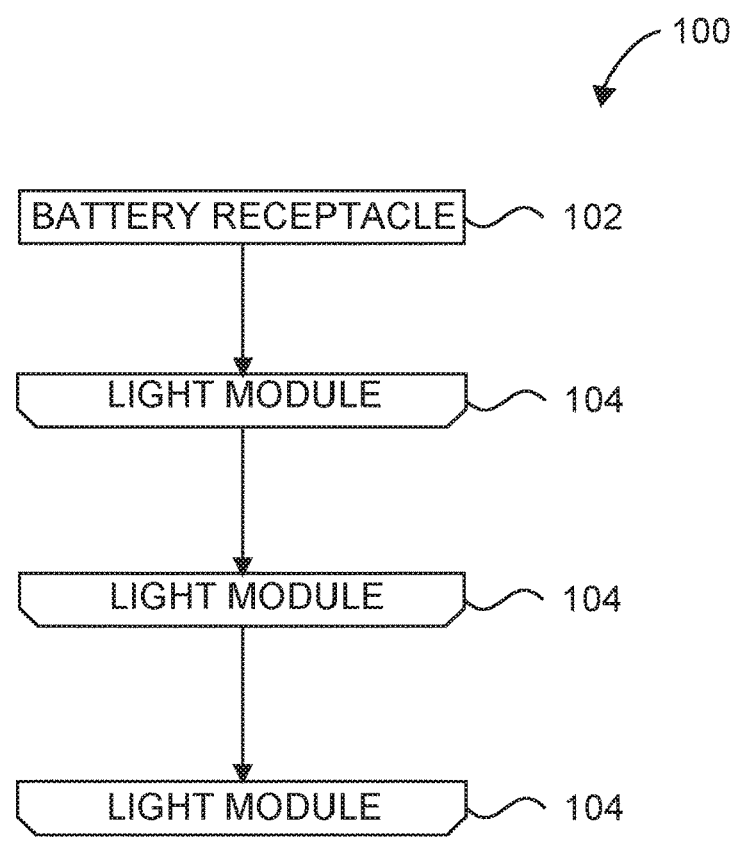
FIG. 1 schematically illustrates a cable light system.

FIG. 1 illustrates a cable light system 100 that includes a battery receptacle 102 and a plurality of light modules 104 connected to the battery receptacle 102. While three light modules 104 are illustrated, more or fewer light modules 104 could be provided.

Figure 2:
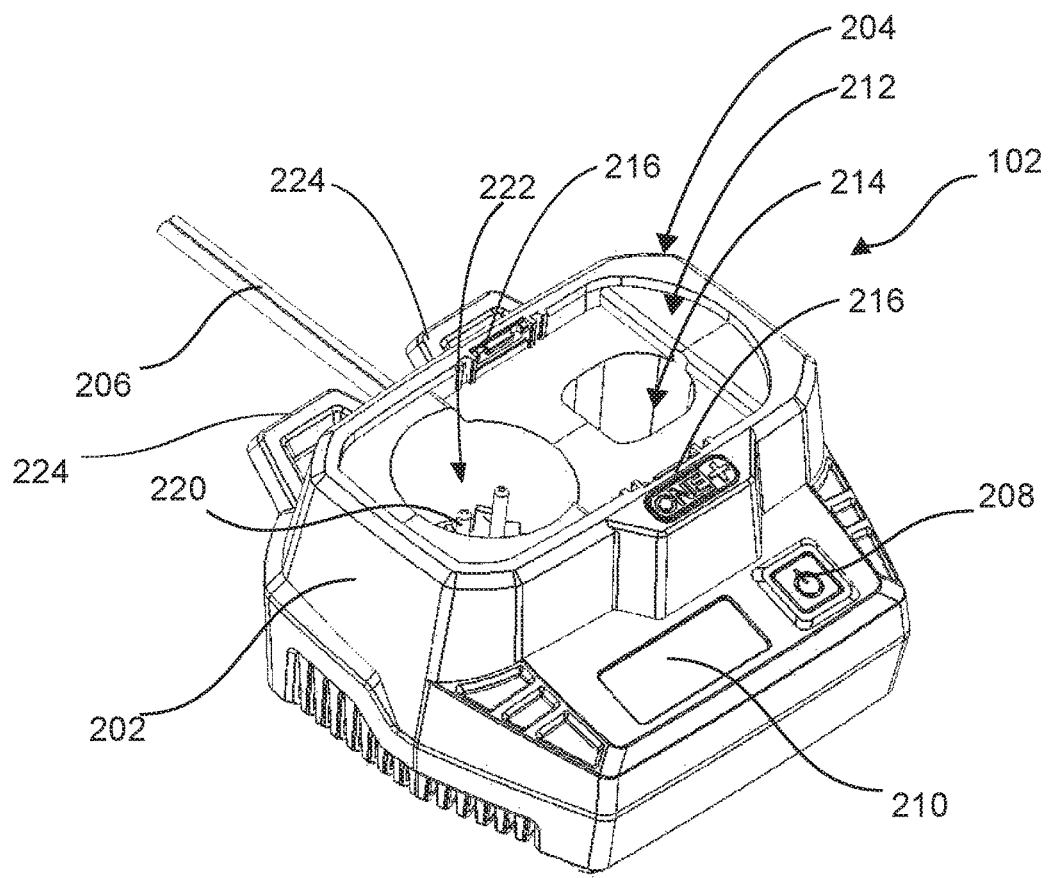
FIG. 2 is a perspective view of a battery receptacle for the cable light system of FIG. 1.
Figure 9:
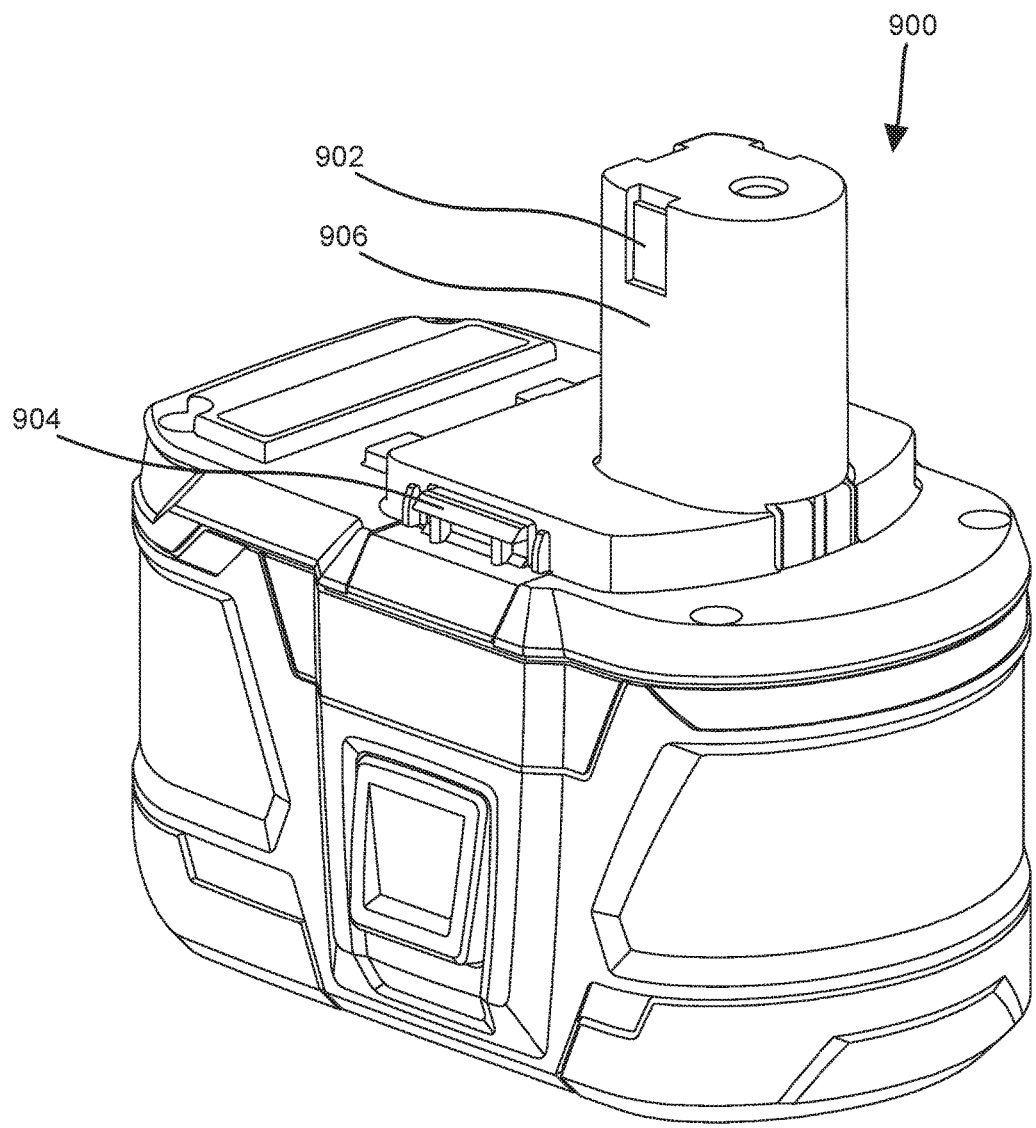
FIG. 9 is a perspective view of a battery pack for use with the battery receptacle of FIG. 2.

FIG. 2 illustrates the battery receptacle 102 of the cable light system 100 of FIG. 1. The battery receptacle 102 includes a housing 202 that defines a battery port 204 to receive the particular battery that is intended to power the cable light system 100. In the embodiment of FIG. 9, the battery is a power tool battery pack 900 (e.g., a lithium ion chemistry pack, a nickel cadmium chemistry pack, etc.) that includes a plurality of battery cells that hold electrical power. The power tool battery pack 900 is commonly used to interchangeably power tools such as drills, saws, and the like. The power tool battery pack 900 is a rechargeable battery pack that is detachably coupled to each power tool or device it is used with.

The battery port 204 includes a recess 212 that is sized and shaped to receive at least a portion of the battery pack 900. The battery receptacle 102 includes charger electrical contacts (not shown) disposed within a cavity 214 that are configured to mechanically and electrically engage battery pack contacts 902 to communicate electrical power and/or data signals therebetween. In addition, the battery port 204 includes two slots 216 disposed on opposed sides of the recess 212 that are configured to receive battery latch members 904 to secure and maintain engagement of the battery pack 900 to the battery port 204. For example, the engagement between the battery latch members 904 and the slots 216 allow the battery pack 900 to be retained within the battery port 204 even when the battery receptacle 102 is rotated 90 degrees or 180 degrees (i.e., flipped upside-down), or suspended above a work area. In the illustrated embodiment, the battery port 204 is configured to receive a stem 906 of the battery pack 900 that is inserted along a vertical insertion axis. However, in other embodiments, the battery port 204 may be configured to receive a battery pack configured as a 'slide on' battery that is inserted along a horizontal insertion axis.

The battery port 204 also includes an AC connector 220 disposed within a second cavity 222. As seen in FIG. 2, the AC connector 220 is disposed within the recess 212 of the battery port 204 such that the AC connector 220 is blocked when the battery pack 900 is received by the battery receptacle 102. The AC connector 220 receives power from, for example, a standard AC power cord such that the battery receptacle can receive power from an external AC power source to power the cable light system. When such a cord or another external power source is coupled to the AC connector 220, the battery receptacle 102 cannot receive the battery pack 900. As such, only one power source (e.g., the battery pack 900 or an external power source via the AC connector 220) can be coupled to the battery receptacle 102 at any time.

The battery receptacle 102 further includes a pair of hooks 224. The hooks 224 are used to, for example, hang the battery receptacle in a work area. The hooks 224 may engage a fastener such as a nail or screw that might be placed in a structural member with a work area.

A cable 206 extends from the housing 202 and is operable to deliver power provided by the battery to each of the light modules 104 (illustrated in FIGS. 3-8). In one construction, the cable 206 includes a wire, which carries electrical power and signals, wrapped in an elastomeric material (e.g., rubber) such that the cable 206 is flexible. The flexibility of the cable 206 allows the light modules 104 to be moved more freely relative to the battery receptacle 102. In addition, the elastomeric material may be waterproof such that water cannot come into contact with the wire within the elastomeric material. In some constructions, the elastomeric material may be coupled to the light modules 104 or the battery receptacle 102 such that only the wire extends into the housing. The coupling of the elastomeric material to the light modules 104 or the battery receptacle 102 may create a water tight seal such that water cannot enter the light modules 104 or the battery receptacle 102 proximate the seal.

A power actuator 208 is provided to turn the light modules 104 on or off as may be desired. In the illustrated embodiment, the power actuator 208 is a button provided on the battery receptacle 102. In other embodiments, the power actuator 208 may be a switch, a slider, a dial, a touch screen interface, and the like that is disposed on one or more of the battery receptacle 102 and the light modules 104. In some constructions, the power actuator 208 can perform other functions such as activating different modes (e.g., ¼ power, ½ power, blinking, activation of a subset of light modules 104, a colored light mode, a timed automatic shut-off, etc.). In the illustrated construction, the battery receptacle 102 includes a display 210 that is capable of providing information to the user. For example, the display 210 may be an LCD or LED screen that displays operational characteristics of the light modules 104 such as an on/off status of each light module 104, a collective on/off status of all of the light modules 104, a charge status of the battery pack 900, a light intensity level, a color of the lights, or a timer (e.g., a countdown until an automatic shut-off).

Figure 3:
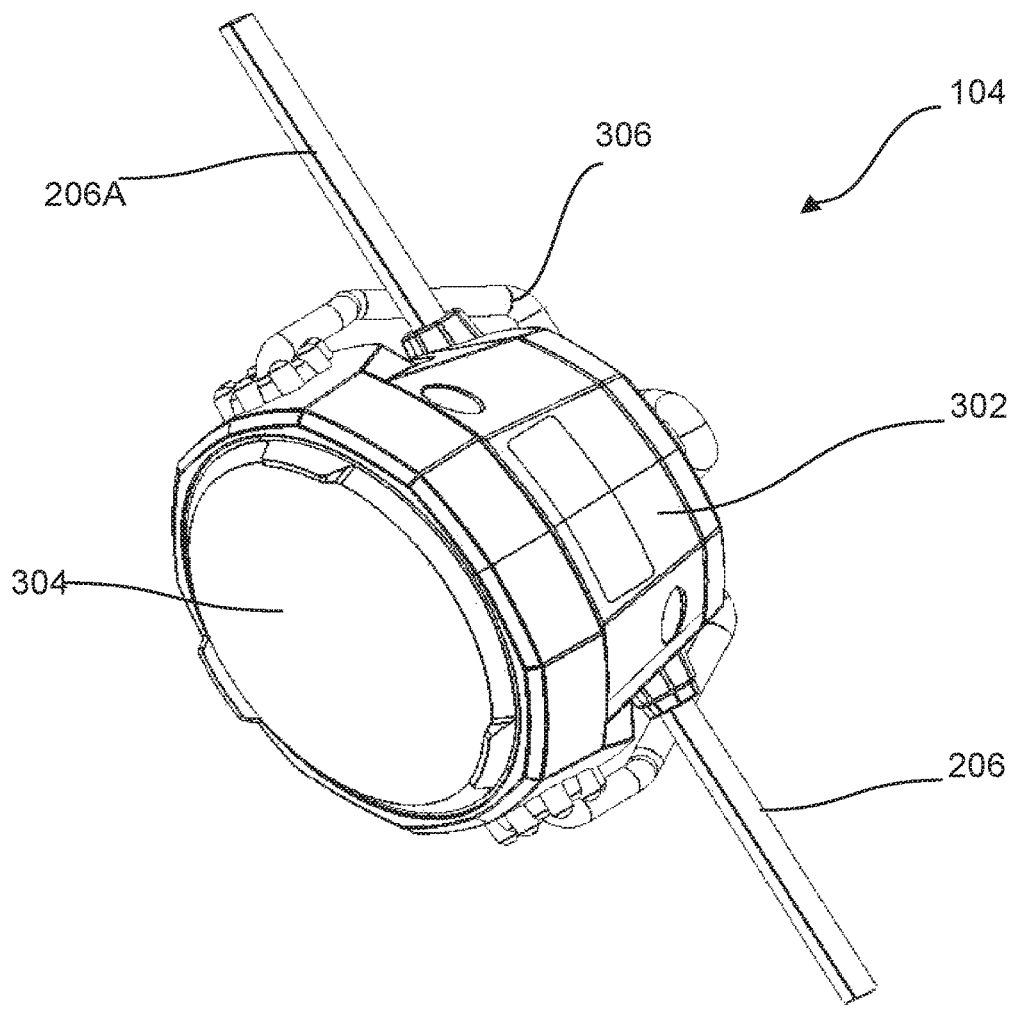
FIG. 3 is a perspective view of a light module for the cable light system of FIG. 1.

FIG. 3 illustrates one example of the light module 104 that is suitable for use with the cable light system 100 of FIG. 1. The light module 104 includes a light housing 302 and an end cap 308 that supports a first cable 206 that provides power from the battery receptacle 102 and a second cable 206A that directs power to the next light module 104 in the cable light system 100. The light housing 302 includes a first light housing section 302A and a second light housing section 302B. Similarly, the end cap 308 includes a first end cap section 308A and a second end cap section 302B.

In some embodiments, a single cable 206 may extend through the end cap 308 or the light housing 302 of each light module 104. Alternatively, multiple discrete cables 206 may extend between adjacent light modules 104 or between a light module 104 and the battery receptacle 102 such that each cable has an endpoint disposed adjacent light modules 104 or the battery receptacle 102.

A lens 304 is coupled to the housing 202 and is arranged to protect a light emitter 402 and is operable to diffuse, focus, or simply transmit the light emitted from the light emitter 402. In some constructions, the lens 304 may modify the color, the temperature, or other features of the light emitted by the light emitter 402 as required.

A hanger 306 is connected to the light housing 202 and provides a convenient means for hanging the light module 104 during use. The hanger 306 is movable relative to the housing to allow for the re-positioning or reorienting of the light module 104 as may be desired.

Figure 4:
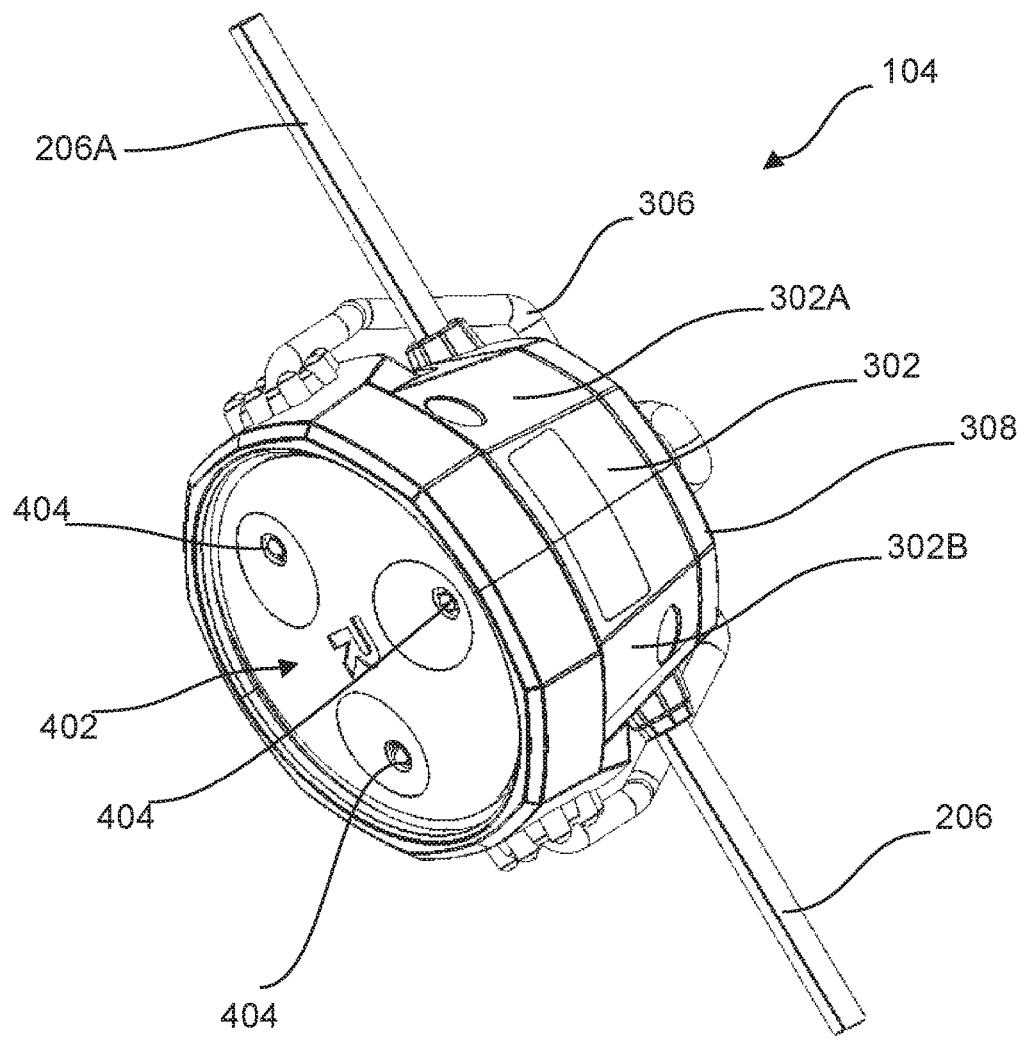
FIG. 4 is a perspective view of the light module of FIG. 3 with a lens removed.

With reference to FIG. 4, the various components of the light emitter 402 are better illustrated. As illustrated, the light emitter 402 includes three LEDs 404 positioned behind the lens 304 and arranged to emit light through the lens 304. The LEDs 404 can be any commercially available LED. In other constructions, other light sources may be used. It should be noted that while three LEDs 404 are illustrated in FIG. 4, other constructions may include fewer LEDs 404 or more LEDs 404, as required.

Figure 5:
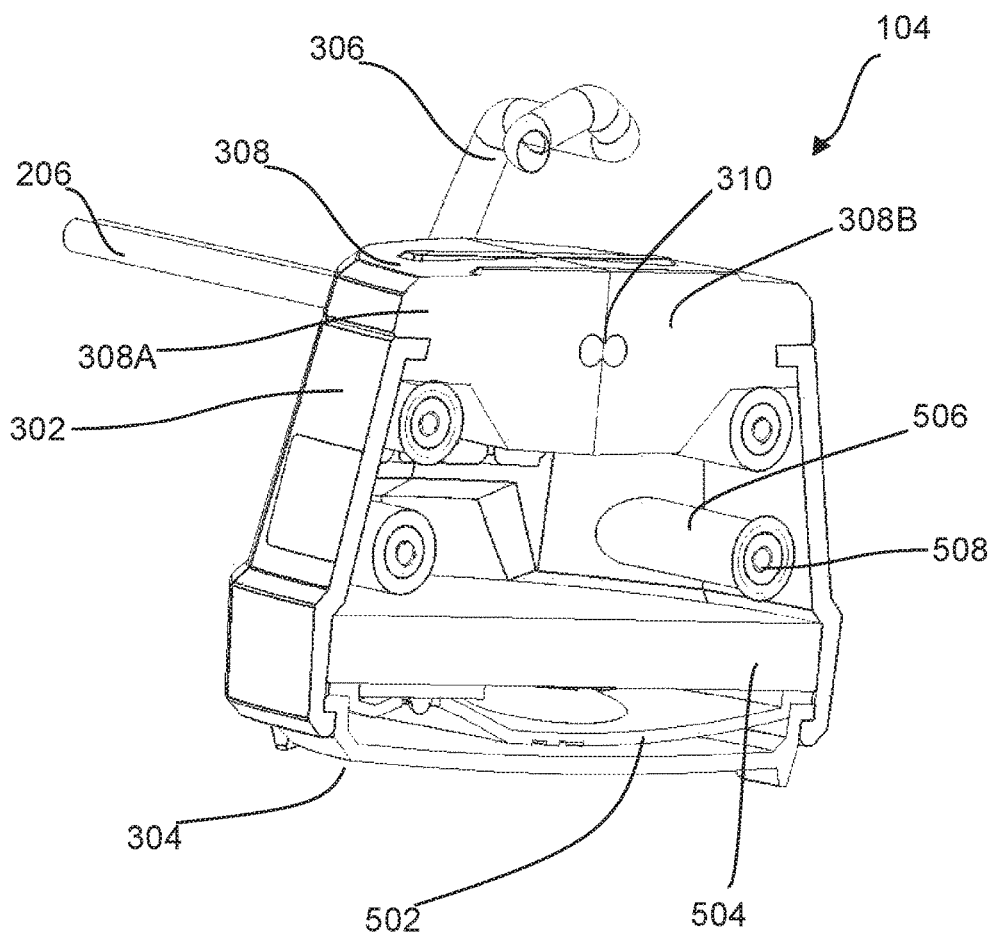
FIG. 5 is a cross-section of the light module of FIG. 3.

FIG. 5 illustrates the arrangement of various internal components within the light housing 302 of the light module 104. As illustrated, the lens 304 engages and is supported in an operating position by the light housing 302.

A reflector 502 is positioned behind the lens and includes a plurality of pockets or opening through which the LEDs 404 extend. In preferred constructions, the reflector 502 includes a reflective surface that enhances the quantity of light that is emitted through the lens 304.

A circuit board and heat sink 504 is positioned behind the reflector 502 and supports the LEDs 404. The circuit board and heat sink 504 provides power to the LEDs 404 and conducts heat away from the LEDs 404 to control the temperature of the LEDs 404.

The end cap 308 provides for passage of the cable 206 through the light housing 302 and also supports circuitry needed to draw power from the cable for the LEDs 404 of the light housing. As seen in FIG. 5, the first end cap section 308A and the second end cap section 308B are symmetric sections that engage each other and support or capture the cable 206 in a bore 310 defined therebetween. The end cap 308 is enclosed by the first housing section 302A and the second housing section 302B. Each of the first housing section 302A and the second housing section 302B include four fastener bosses 506 that are each arranged to receive one of four fasteners 508 that attach first housing section 302A and the second housing section 302B. While four fastener bosses 506 and fasteners 508 are illustrated, other constructions may use fewer or more as may be required. The configuration described above allows the first end cap section 308A and the second end cap section 308B to be retained together by the coupling of the first housing section 302A and the second housing section 302B such that fasteners or other coupling features are unnecessary. However, in other constructions, the first end cap section 308A and the second end cap section 308B may be coupled via fasteners, adhesives, or other suitable means.

Figure 6:
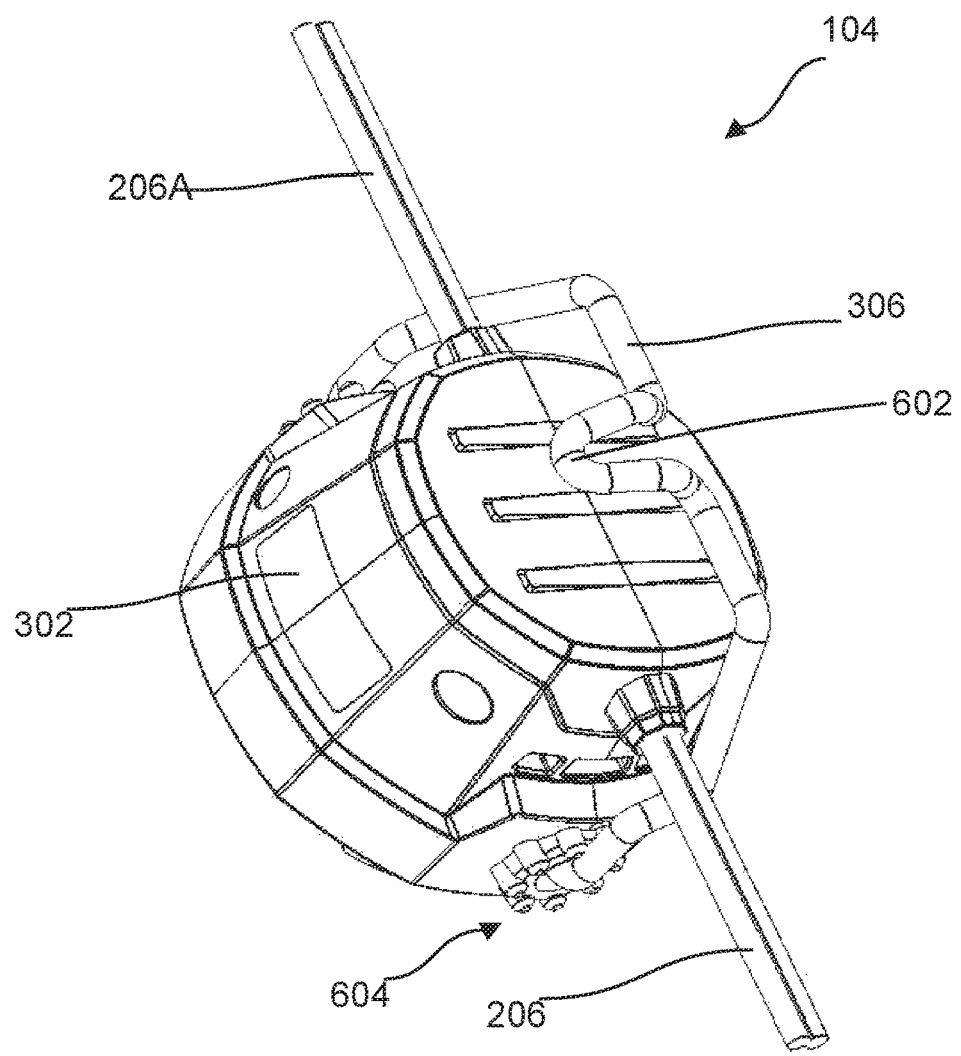
FIG. 6 is a perspective view of the light module of FIG. 3.
Figure 8:
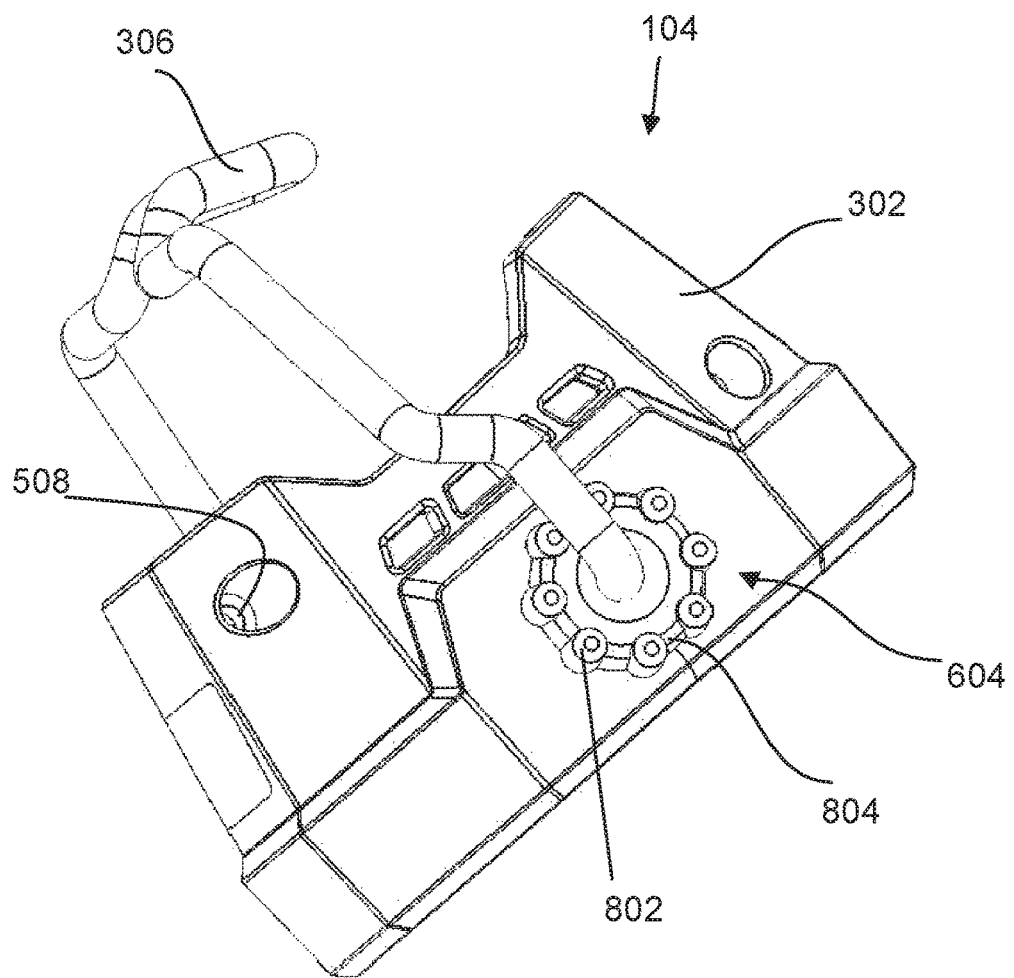
FIG. 8 is a side view of the light module of FIG. 3.

FIG. 6 and FIG. 8 better illustrate the hanger 306. The hanger 306 is preferably a cylindrical member that includes a hanger hook 602 at a position near its center. The hanger hook 602 is shaped to facilitate hanging the light module 104 on a fastener, such as a nail or screw that might be placed in a structural member.

A hanger lock 604 is formed as part of the light housing 302 and is arranged to engage the hanger hook 602 to lock the hanger hook 602 in a desired position.

Figure 7:
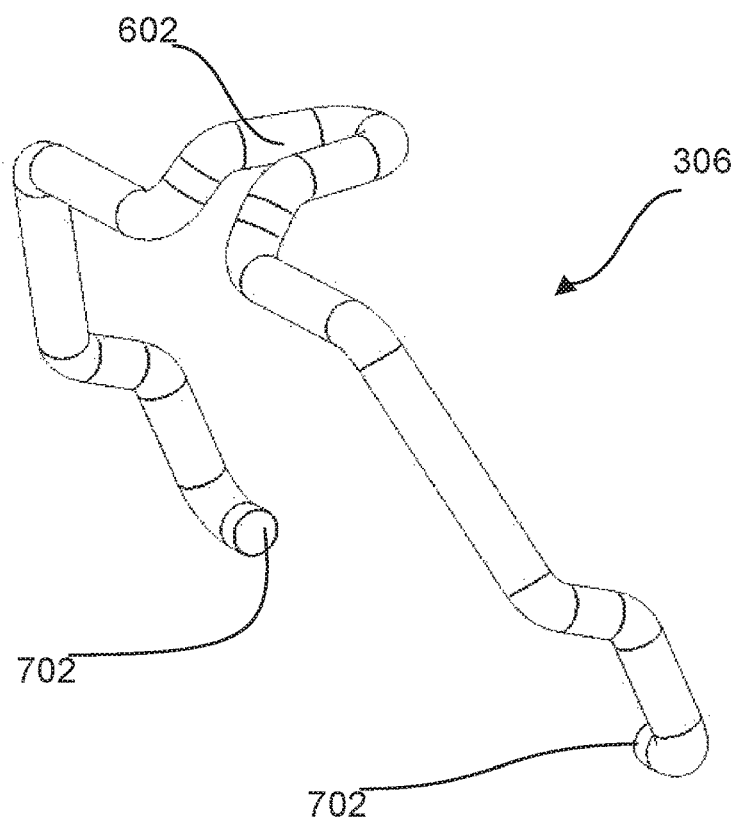
FIG. 7 is a perspective view of a hanger of the light module of FIG. 3.

The hanger 306, best illustrated in FIG. 7, includes the hanger hook 602 that is substantially centered between a first hanger end 702 and a second hanger end 702. Each hanger end 702 is arranged to rotatably engage the light housing 302 to allow for the repositioning of the hanger 306 with respect to the light housing 302.

As is better illustrated in FIG. 8, the hanger lock 604 includes a plurality of lock knobs 802 that are spaced apart from one another in a circular arrangement to define a plurality of lock spaces 804. In the illustrated construction, eight lock knobs 802 cooperate to define eight lock spaces 804 therebetween. Of course, other numbers of lock knobs 802 and lock spaces 804 could be employed if desired. Each of the lock knobs 802 includes a tapered conical or frusto-conical member that extends from the surface of the light housing 302.

While FIG. 8 illustrates only the hanger lock 604 on one side of the light housing 302, it should be understood that a similar hanger lock 604 is formed on the opposite end of the light housing 302. Thus, each hanger end 702 is positioned in an aperture formed in the light housing 302 in the center of each hanger lock 604.

In operation, a user inserts a power tool battery pack or other battery into the battery port 204 of the battery receptacle 102 of FIG. 2. The power button 208 is then depressed to activate the cable light system 100 and deliver power to the various light modules 104. The display 210 can provide the user information such as illumination level, the state of charge of the battery, the duration of illumination at the current level, etc. as may be desired.

Each light module 104 is positioned as desired and is attached to a structural member or hung from an object using the hanger 306. The light housing 302 can be rotated or pivoted with respect to the hanger hook 602 to one of eight positions. Each position is defined by the lock spaces 804. Specifically, the hanger 306 rotates over the lock knobs 802 and "falls" within the lock spaces 804 to fix the position of the hanger 306.

Various features and advantages of the invention are set forth in the following claims.

What is claimed is:

1. A cable light comprising:
a battery receptacle including a housing defining a battery port configured to receive and retain a removable power tool battery pack;
a first light module electrically coupled to the battery receptacle, the first light module including a housing supporting a lens, a heat sink positioned in the housing behind the lens, a light emitter mounted to the heat sink, and a hanger movably coupled to the housing, the light emitter configured to receive power from the removable power tool battery pack, the hanger configured to engage a fastener; and
a second light module electrically coupled to the battery receptacle via the first light module, the second light module including a housing supporting a lens, a heat sink positioned in the housing behind the lens, a light emitter mounted to the heat sink, and a hanger movably coupled to the housing, the light emitter configured to receive power from the removable power tool battery pack, the hanger configured to engage a fastener.

2. The cable light according to claim 1, wherein the light emitter of the first light module includes an LED and the light emitter of the second light module includes an LED.

3. The cable light according to claim 1, wherein the battery receptacle further includes a power actuator operable to selectively provide power from the removable power tool battery pack to the first and second light modules.

4. The cable light according to claim 1, wherein the battery receptacle further includes an AC connector configured to be coupled to an external AC power source.

5. The cable light according to claim 4, wherein the AC connector is blocked by the removable power tool battery pack when the removable power tool battery pack is coupled to the battery port.

6. The cable light according to claim 1, wherein the battery port is configured to receive and retain a removable lithium-ion power tool battery pack.

7. The cable light according to claim 1, wherein the hanger of the first light module is rotatably coupled to the housing of the first light module, and wherein the hanger of the second light module is rotatably coupled to the housing of the second light module.

8. The cable light according to claim 7, wherein the housing of the first light module further includes a plurality of lock knobs defining a plurality of lock spaces therebetween, and wherein the hanger of the first light module is configured to be retained within each of the lock spaces by the lock knobs to define a plurality of rotational positions of the hanger.

9. The cable light according to claim 7, wherein each hanger includes a hanger hook centered between a first hanger end and a second hanger end.

10. The cable light according to claim 1, wherein the housing of the first light module includes a two-piece housing coupled together by a fastener, wherein the first light module further includes an end cap at least partially enclosed by the two-piece housing, and wherein a cable extends through the end cap and provides power to the light emitter.

11. The cable light according to claim 1, wherein the battery receptacle further includes a display operable to provide information related to the cable light to a user.

12. The cable light according to claim 1, wherein a cable extends from the battery receptacle to the first light module to provide power from the removable power tool battery pack to the first light module.

13. The cable light according to claim 12, wherein the cable further extends from the first light module to the second light module to provide power from the removable power tool battery pack to the second light module.

14. The cable light according to claim 12, wherein the cable extends through the housing of the first light module to the second light module.

15. A lighting system comprising:
a removable power tool battery pack including a battery pack housing, a battery cell positioned within the battery pack housing, a plurality of battery pack contacts supported on the battery pack housing, and a latch member movably coupled to the battery pack housing;
a battery receptacle including a battery receptacle housing defining a battery port that receives at least a portion of the removable power tool battery pack, and a slot that engages the latch member to releasably retain the removable power tool battery pack;

a first light module that is electrically coupled to the battery receptacle via a first cable extending between the battery receptacle and the first light module, the first light module including a housing supporting a reflector, a light emitter configured to receive power from the removable power tool battery pack, a hanger, and a lens; and a second light module that is electrically coupled to the battery receptacle via a second cable extending between the first light module and the second light module, the second light module including a housing supporting a reflector, a light emitter configured to receive power from the removable power tool battery pack, a hanger, and a lens.

16. The lighting system according to claim 15, wherein the battery receptacle further includes an AC connector configured to be coupled to an external AC power source.

17. The lighting system according to claim 16, wherein the AC connector is blocked by the removable power tool battery pack when the removable power tool battery pack is coupled to the battery port.

18. The lighting system according to claim 15, wherein the power tool battery pack is a lithium-ion battery pack configured to be coupled to at least one power tool in addition to the battery port.

19. The lighting system of claim 15, wherein the housing of the first light module further includes a plurality of lock knobs defining a plurality of lock spaces therebetween, and wherein the hanger is configured to be retained within each of the lock spaces by the lock knobs to define a plurality of rotational positions of the hanger.

20. The lighting system of claim 15, wherein the first cable and the second cable form a single cable.

21. A lighting system comprising:

a removable power tool battery pack including a battery cell, the removable power tool battery pack configured to interchangeably power tools and detachably couple to each tool;

a battery receptacle including a housing defining a battery port that receives and retains the removable power tool battery pack;

a first light module that is electrically coupled to the battery receptacle via a first cable extending between the battery receptacle and the first light module, the first light module including a housing supporting a lens and a light emitter configured to receive power from the removable power tool battery pack; and a second light module that is electrically coupled to the battery receptacle via a second cable extending between the first light module and the second light module, the second light module including a housing supporting a lens and a light emitter configured to receive power from the removable power tool battery pack.

* * * * *